(No Model.)

H. T. PAISTE.
ELECTRIC CUT-OUT.

No. 593,853. Patented Nov. 16, 1897.

Witnesses.
Frank L. G. Graham
J. E. Bechtold

Inventor,
Harry T. Paiste
by his Attorneys
Howson & Howson

THE NORRIS PETERS CO., PHOTO-LITHO., WASHINGTON, D. C.

UNITED STATES PATENT OFFICE.

HARRY T. PAISTE, OF PHILADELPHIA, PENNSYLVANIA.

ELECTRIC CUT-OUT.

SPECIFICATION forming part of Letters Patent No. 593,853, dated November 16, 1897.

Application filed July 8, 1897. Serial No. 643,895. (No model.)

*To all whom it may concern:*

Be it known that I, HARRY T. PAISTE, a citizen of the United States, residing in Philadelphia, Pennsylvania, have invented certain Improvements in Electric Cut-Outs, of which the following is a specification.

The object of my invention is to so construct an electric cut-out that while the connections with the line-wires and also the means for securing the cap and base together will be exposed and readily accessible the electrical connections between the cap and base will be wholly within the limits of the cap and will be effectually protected thereby, these electrical connections, moreover, being such that they serve to prevent accidental loosening of the mechanical connections between the cap and base.

Figure 1:
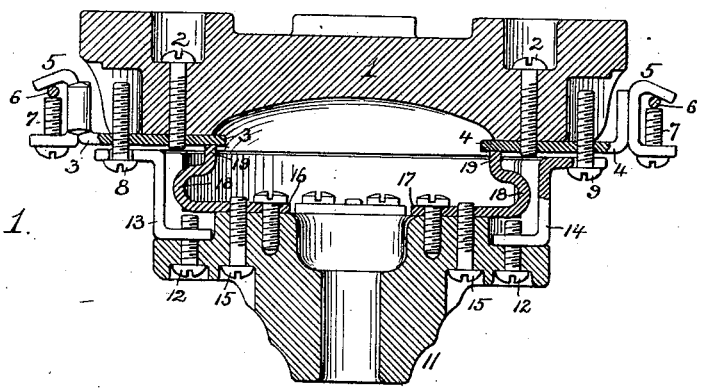
Figure 2:
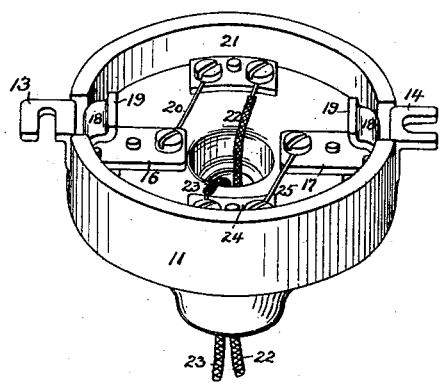
Figure 3:
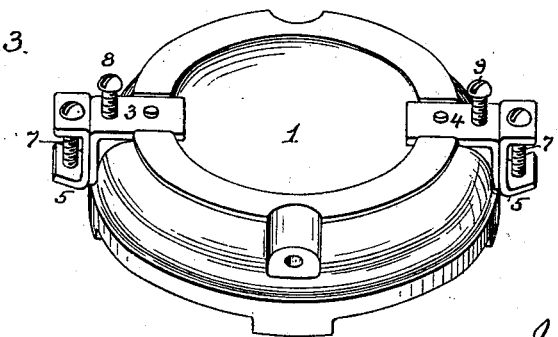

In the accompanying drawings, Figure 1 is a transverse section of an electrical cut-out constructed in accordance with my invention. Fig. 2 is a perspective view of the cap and its attachments removed from the base-block, and Fig. 3 is an inverted perspective view of the base-block and its attachments.

I have shown my invention as applied to what is known as a "ceiling cut-out"—that is to say, a device intended to be applied to the ceiling of a room or apartment to receive the line-wires, the device being provided with connections whereby the current is conveyed to a lamp or other current-utilizing object, and these connections being such that in case of a current of undue strength portions of the connection will be fused and the circuit broken. My invention is, however, applicable to electrical cut-outs generally wherever they are used.

The base-block of the cut-out is represented at 1, said block having secured to it by means of screws 2 a pair of plates 3 4, these plates being, by preference, diametrically opposite to each other, and each plate having secured to or forming part of it a clamp 5 for the line-wire 6, which is secured to said clamp by means of a set-screw 7. The plate 3 has a projecting screw 8, and the plate 4 has a similar screw 9, which screws serve as the means for retaining the cap 11 in place on the base-block. The said cap 11 has secured to it, by means of screws 12, angular or Z-shaped plates 13 and 14, the plate 13 having a flange with a lateral notch for engaging with the stem of the screw 8 of the plate 3 and the plate 14 having a flange with a longitudinal notch for engaging with the stem of the screw 9 of the plate 4. Secured to the inner side of the cap by means of screws 15 are plates 16 and 17, each of which is bent so as to form a loop 18, terminating in a finger 19, projecting upwardly, and adapted when the cap is in place to bear against the inwardly-projecting portion of one of the plates 3 4 of the base-block, so as to form an electrial connection therewith.

The plate 16 is connected by a fusible wire or other equivalent fuse-strip 20 to a plate 21 on the inner side of the cap, to which plate is also connected one of the insulated wires 22, leading to the lamp or other current-utilizing object, and, in like manner, the returnwire 23 is connected to an opposite plate 24 in the cap, which latter plate is connected by a fusible wire or strip 25 to the plate 17.

Owing to the slotting of the flanges of the plates 13 and 14 for engagement with the stems of the confining-screws 8 and 9 the cap can be applied to or removed from the base without necessitating the removal of said screws, but owing to the loops 18 of the plates 16 and 17 the fingers 19 of said plates have a certain amount of elasticity, and hence can be pressed firmly against the plates 3 and 4, so as to insure good electrical contact of both fingers and at the same time cause such outward pressure of the flanges of the plates 13 and 14 against the heads of the screws 8 and 9 that any accidental turning of the cap so as to release the plates from the control of said screws will be prevented, intentional release, however, being readily effected by the application of sufficient force to the cap to withdraw the flange of the plate 13 laterally from the screw 8, whereupon the cap is released from pressure and the flange of the plate 14 can be readily withdrawn longitudinally from the screw 9.

It will be observed that while the line connections and the mechanical connections whereby the cap is secured to the base are wholly outside of the cap, and hence are exposed and readily accessible, the electrical connections between the cap and base are wholly inside of said cap and are fully protected thereby.

Having thus described my invention, I claim and desire to secure by Letters Patent—

1. The combination in an electrical cut-out, of the base having contact-plates, and line-wire connections, the cap having plates forming electrical connection with the contact-plates of the base, and other plates providing for mechanical connection therewith, and set-screws for effecting this mechanical connection, the latter and the line-wire connections being wholly outside of the limits of the cap and the electrical connections being wholly inside of the same, substantially as specified.

2. The combination in an electrical cut-out, of the base having inwardly-projecting contact-plates and external retaining-screws, with the cap having contact-plates with loops forming within the cap elastic contact portions for bearing against the inwardly-projecting contact-plates of the base, and notched securing-plates projecting outwardly beyond the cap and adapted to engage with the external retaining-screws on the base, substantially as specified.

3. The combination in an electrical cut-out, of the base having inwardly-projecting contact-plates thereon and external cap-retaining screws, and the cap having contact-plates with loops terminating within the cap in projecting contact-fingers adapted to bear yieldingly against the inwardly-projecting contact-plates of the base, and notched and outwardly-projecting securing-plates adapted to engage with the external retaining-screws on the base, substantially as specified.

In testimony whereof I have signed my name to this specification in the presence of two subscribing witnesses.

HARRY T. PAISTE.

Witnesses:
F. E. BECHTOLD,
JOS. H. KLEIN.